United States Patent [19]
Cirigliano et al.

[11] Patent Number: 5,773,062
[45] Date of Patent: Jun. 30, 1998

[54] TEA BEVERAGE PRESERVATION AND METHOD OF MAKING

[75] Inventors: Michael Charles Cirigliano, Cresskill; Raymond Thomas McKenna, Scotch Plains; Paul John Rothenberg, West Milford, all of N.J.

[73] Assignee: Thomas J. Lipton Co., Division of Conopco, Inc., Englewood Cliffs, N.J.

[21] Appl. No.: 762,014

[22] Filed: Dec. 11, 1996

[51] Int. Cl.$^6$ .................................. A23F 3/14; A23L 2/00
[52] U.S. Cl. ..................... 426/330.3; 426/42; 426/335; 426/477; 426/597; 426/654
[58] Field of Search ..................... 426/597, 654, 426/477, 330.3, 335, 42

[56] References Cited

U.S. PATENT DOCUMENTS

| | | | |
|---|---|---|---|
| H1628 | 1/1997 | Kanayake | 426/597 |
| 464,861 | 5/1891 | Pritikin | 264/173 |
| 4,539,216 | 9/1985 | Tse | 426/597 |
| 4,600,706 | 7/1986 | Carter | 514/31 |
| 4,797,293 | 1/1989 | Evans et al. | 426/597 |
| 5,196,344 | 3/1993 | Ruttan | 436/18 |

OTHER PUBLICATIONS

Flak et al, 1988, Determination of wines an Other Beverages by High Pressure Liquid Chromatography, Mitteilungen Klosterneuburg, 38(24) 10–16.

Millies, K. et al. 1977, Natamycin, Fluess. Obst (Bad Homburg)(44) 56–64.

Khoudo Kurmoff, B. 1984. Are Resistance Development and Morphological Changes Possible. Wein–Wissenschaft, vol. 39, pp. 45–50.

J. Giese, "Antimicrobials: Assuring Food Safety", Food Technology, 48(6)pp. 101–110, Jun. 1994.

Morris and Hart, "Pimaricin–What is It?", Culture Dairy Products Journal, vol. 13, p. 22, 1978.

T. Mattila, "Automated Turbidometry—A Method for Enumeration of Bacteria in Food Samples", Journal of Food Protection, 50, pp. 640–642, Aug. 1987.

*Primary Examiner*—Helen Pratt
*Attorney, Agent, or Firm*—James J. Farrell

[57] ABSTRACT

An aqueous based tea solids containing beverage and a method for its preparation is disclosed. The beverage contains sufficient Natamycin to prevent the outgrowth of yeast and/or mold.

12 Claims, No Drawings

TEA BEVERAGE PRESERVATION AND METHOD OF MAKING

CROSS-REFERENCE TO RELATED APPLICATION

This application claims the benefit of U.S. Provisional Application Ser. Nos. 60/020,155, filed Jun. 20, 1996 and 60/020,156, filed Jun. 20, 1996.

BACKGROUND OF THE INVENTION

1. Field of the Invention

The present invention relates to the use of a natural preservative such as Natamycin in aqueous based beverages containing tea solids which under some conditions are subject to yeast and mold outgrowth.

2. Related Art

Natamycin, also known as pimaricin, is an antifungal agent produced by *Streptomyces natalensis*. The compound is effective against yeasts and molds and is reported to be ineffective against bacteria. It is approved for use as an additive which may be applied to the surface of cuts and slices of cheese to inhibit mold spoilage (21 CFR 172.155). This information is available from an article on "Antimicrobials: Assuring Food Safety" by J. Giese in the June 1994 Food Technology periodical 48 (6) pp. 101–110.

Natamycin has been used in animal feeds U.S. Pat. No. 4,600,706, in sausages and sausage casings U.S. Pat. No. 4,664,861 and in mixtures with other preservatives to preserve milk U.S. Pat. No. 5,196,344.

Generally, however, the solubility of Natamycin has limited its use to the surface treatment of cheese for which it is approved by the FDA.

Natamycin has also been of interest in the treatment of food products because it is highly active against yeasts and molds, as opposed to bacteria (see Morris and Hart, "Pimaricin—What is It?", *Culture Dairy Products Journal*, Volume 13, page 22, 1978.) Reportedly, Natamycin has been applied to food products in several ways. It has been added in dry form to liquids, slurries, pastes and semisolids when adequate mixing can be accomplished, or the pure Natamycin can be mixed with one or more of the dry ingredients and then added to a given food product. Solid foods requiring surface protection can be dipped, misted, fogged or dusted with a solution or suspension of Natamycin. Additionally, it has been suggested that protection from yeast and molds may be achieved in solid food by incorporating Natamycin homogeneously into the food itself.

Natamycin has also been used to retard spoilage of dressed poultry, to protect cottage cheese, and has been widely used in the dip-treatment of cheeses to coat them with the fungicide which is absorbed slightly, and dries to form a solid, surface coating. Various other reports suggest that Natamycin is effective in the treatment of fresh berries, tomatoes, strawberries and raspberries. These reports indicate that Natamycin has an antiyeast activity when added to wines, and various fruit juices, such as apple juice or orange juice. (See, Morris and Hart, cited above.)

BRIEF DESCRIPTION OF THE INVENTION

Many preservatives are readily available for many diverse uses. Tea containing beverages, however, because of their delicate balance of flavors require the utmost care in selecting preservatives. In addition, tea containing beverages are difficult systems to stabilize particularly against eucaryotic organisms such as mold and yeast which have a competitive advantage in many of these beverages. A fine balance must thus be achieved in stabilizing teas without deleteriously affecting their flavor.

A method for preserving tea beverages including herbal teas, both "still" and carbonated, for distribution and sale at ambient or chilled temperatures is disclosed while permitting an "all natural" claim according to the current labelling conventions. The method uses Natamycin (pimaricin) to prevent microbial spoilage in the absence of chemical preservatives. Acidified and native pH ready-to-drink (RTD) tea beverages, in the 2.5–6.5 pH range are known to be susceptible to spoilage by yeast and mold. As compared to cans, tea beverages packaged in glass and plastic bottles (because of increased $O_2$ ingress), as well as those at the higher range of the pH spectrum, are particularly sensitive to yeast and mold spoilage. Natamycin, when introduced into various tea beverages, in its commercial form as "Delvocid"—a 50/50 blend with lactose at concentrations ranging from 10–250 ppm, completely inhibited the outgrowth of yeast and significantly delayed, or completely inhibited (depending on concentration and other factors), mold spoilage. Thus, Natamycin alone at levels of about 5 ppm to 125 ppm or even higher are effective.

The stability and ostensibly the efficacy of Natamycin, reported to be sensitive to oxidation, appears to be enhanced, as evidenced by the stability achieved in PET and glass bottles, by the presence of at least about 0.01 to 0.5% tea solids which contain naturally occurring antioxidants. Higher percentages of tea solids are also applicable. Several of the preferred embodiments of tea containing beverages also include ascorbic acid, a known oxygen scavenger, which also contributes to this effect.

Heavy and divalent metals are also reported to adversely affect the stability of Natamycin. One preferred embodiment incorporates citric acid a natural sequestrant. This is further enhanced by the incorporation of other sequestering agents and/or by water hardness control which removes heavy metals as well as divalent metals. This negates the effect and sustains the efficacy of the Natamycin in an "all-natural" system. Other sequestering agents such as EDTA and its organic and inorganic salts e.g. sodium and the like; metaphosphoric acid salts, polyphosphoric acid salts, tartaric acid salts, and phosphoric acid may also be used to sustain system efficacy over time, where water hardness control is not absolute.

Further, the simple expedient of incorporating a concentration of Natamycin, preferably 1.5 times or even more in excess of its maximum solubility, also significantly enhanced its effect, ostensibly by providing a "preservative" reserve buffer.

Natamycin, a fermentation by-product that is a naturally derived antimicrobial thus affords an opportunity to stabilize certain tea containing beverage formulations naturally without the use of chemical preservatives.

Natamycin is a creamy white, odorless, tasteless, practically insoluble crystalline amphoteric powder. It belongs to the polyene macrolide or macrycyclic lactone group of compounds. In low concentrations, Natamycin is a potent inhibitor of fungal microorganisms.

Natamycin is relatively stable when in a dry state or when mixed with dry diluents. However, the molecule is sensitive to ultraviolet light, oxygen, or extreme pH values. It is relatively insoluble in water in which its solubility is of the order 0.005–0.010 weight/weight percent. Additionally, even in solution, Natamycin is rather unstable. Aqueous solutions of 16 mcg/ml of Natamycin became microbiologically inactive after 24 hour exposure to light. Inactivation of Natamycin by light, peroxides or oxygen proceeds at the fastest rate in solution or suspension. Natamycin is also sensitive to heavy metals, and it may lose up to 75% of its effectivity in 4–5 hours in their presence.

Natamycin is also referred to by other names, e.g. Pimaricin, antibiotic A 5283, tennecetin, CL 12625, Mycrophyt, Myprozine, Natacyn and Pimafucin. Naturally, the present invention extends to compositions employing Natamycin under any of its alternative names or designations. The antibiotic is currently available from a number of companies under various trademarks, e.g. from Gist-Brocades Food Ingredients, Inc. of King of Prussia, Pa. under the trademark DELVOCID®. Further details of the antibiotic can be found in The Merck Index, Tenth Edition, 1983, published by Merck & Co., Inc., entry no. 6278, page 922.

The addition of about 10 to 250 ppm of Natamycin to tea containing beverages has been found to reduce or completely eliminate yeast outgrowth in the tea beverage in the time frame required for commercial sale, i.e. for about 16 weeks.

The advantage of using Natamycin is that it allows the reduction or elimination of chemical preservatives thereby making a microbiologically stable beverage which is also significantly more organoleptically acceptable than those containing higher levels of chemical preservatives.

As used herein, the term "tea concentrate" refers to a product derived from concentrated tea extract which is diluted with water to form a drinkable tea beverage. The method of extraction is not significant and any methods known in the art may be used.

As used herein, the term "tea beverage" refers to a drinkable beverage prepared from tea concentrates, extracts or powder. This may be achieved by dilution with water. Various other flavoring agents and/or juices may also be included such as fruit juices, vegetable juices and the like. The tea beverage concentrate or powder is generally diluted with sufficient water to provide the drinkable tea beverage. Preferred tea concentrates or powders are typically diluted to a minimum of about 0.08% tea solids to provide the drinkable tea beverage but this depends on the flavor profile sought and amounts of 0.01 to 0.5% or higher may be used.

As used herein, the term "tea solids" refers to those solids normally present in a tea extract including normal antioxidants. Polyphenolic compounds are normally the primary component of tea solids. However, tea solids can also include caffeine, proteins, amino acids, minerals and carbohydrates.

All parts and proportions herein and in the appended claims are by weight unless otherwise indicated.

EXAMPLE 1

SUMMARY

The Bioscreen test as described in an article entitled "Automated Turbidometry—A Method For Enumeration of Bacteria in Food Samples" by T. Mattila in the Journal of Food Protection, pp. 540–542, 50, no. 8 (August 1987) was found to be an effective applied research tool in studying the dynamics of microbial growth and inhibition. It also is currently being used as a test screening vehicle to help identify preservative system alternatives for teas. In this study, Natamycin was screened to help identify a substitute for EDTA, in the yeast stabilization of cold-filled Ready-to-Drink tea.

In phase I of this study a bacteriocin (Natamycin), was compared to EDTA, for Z. bailii yeast inhibition, in a sorbate/benzoate preserved tea model system medium. This medium contained components found in a tea beverage but excluding any actual tea. The medium contained the following components:

| | |
|---|---|
| Difco Yeast Nitrogen Base | 0.6% |
| Sugars | 8.0% |
| Citric Acid | .1% |
| K benzoate | .03% |
| K sorbate | .04% |
| Sodium Hexametaphosphate | .05% |
| Water | balance |
| 85% phosphoric acid was used as an acidulant to pH 2.8 | |

Natamycin at all concentrations tested, was found to be as effective as the EDTA control in inhibiting yeast outgrowth.

All screening study variables were incorporated into the tea model system medium, formulated with field water at a total water hardness level of 125 ppm as calcium carbonate. The organism challenge pool included selected tea spoilage strains of Z. bailii, at an inoculation level of approximately 1,000 cells/mi.

RESULTS

1. In the standard 6–7 day Bioscreen test time frame, the performance of all 3 Natamycin (100, 200, and 300 ppm) concentration levels was equal to that of the EDTA control, i.e. totally inhibiting Z. bailii outgrowth during the time period covered.

2. The positive control (without EDTA or Natamycin) showed Bioscreen outgrowth beginning on, approximately, day 3 of the study with a maximum response on day 6. Relative to in-bottle challenge studies this equates to actual spoilage in about 3–4 weeks.

Further Testing

A series of tests using Natamycin at varying levels, in water of varying hardness and also at varying inoculation levels of yeast were run. The tests were run on selected beverages representative of commercial ready-to-drink tea beverages. The pH in some cases was varied.

Several different tea beverages were prepared for testing with the preservative of the invention as follows:

Beverage A.

This contained the following ingredients:

| | |
|---|---|
| K Sorbate | .03% |
| K benzoate | .04% |
| Tea Powder | .08% |
| Color Component | .06% |
| Citric Acid | .07% |
| Lemon Flavor | .1% |
| Sodium Hexametaphosphate | .05% |
| EDTA | .003% (30 ppm) |
| HFCS (High Fructose Corn Syrup) | 12% |
| Water balance to | 100% |

Beverage B.

This contained the following ingredients:

| | |
|---|---|
| K sorbate | .03% |
| K benzoate | .04% |
| Tea Powder | .08% |
| Natamycin (Delvocid 50% Natamycin) | .04% (200 ppm Natamycin) |
| Color Component | .06% |

-continued

| | |
|---|---|
| Citric Acid | .07% |
| Lemon Flavor | .1% |
| Sodium Hexametaphosphate | .05% |
| HFCS | 12% |
| Water balance to | 100% |
| The pH was adjusted to 2.8 with 85% phosphoric acid. | |

The pH was adjusted to 2.8 with 85% phosphoric acid.
Beverage C. 50 ppm Natamycin
This contained the following ingredients:

| | |
|---|---|
| Tea Powder | .08% |
| Color Component | .06% |
| Citric Acid | .07% |
| Lemon Flavor | .1% |
| HFCS | 12% |
| Natamycin (Delvocid 50% Natamycin) | .01% (50 ppm Natamycin) |
| Water balance to | 100% |

The pH of Beverage C was varied to pH 2.8; 3.3 and 3.8 by adjustment with 85% phosphoric acid.

EXAMPLE 2 (Table 1)

A series of tests were run on a tea beverage treated with 200 ppm of Natamycin to compare it to EDTA. The water hardness employed is 102 ppm as Ca(CO$_3$). The amount of EDTA used is 30 ppm. The amount of Natamycin used is 200 ppm.

TABLE 1

SUMMARY OF TIME TO YEAST SPOILAGE EXPRESSED
AS # OF BOTTLES SPOILED PER WEEK

| | BEVERAGE A | | | BEVERAGE B |
|---|---|---|---|---|
| | EDTA - 30 ppm H | EDTA - 30 ppm M | EDTA - 30 ppm L | NAT - 200 ppm M |
| TOTAL UNITS TESTED | 36 | 38 | 37 | 37 |
| WK 1 | 0 | 0 | 0 | 0 |
| WK 2 | 0 | 0 | 0 | 0 |
| WK 3 | | | | |
| WK 4 | 0 | 0 | 0 | 0 |
| WK 5 | 36 | 7 | 2 | 0 |
| WK 6 | 0 | 10 | 1 | 0 |
| WK 7 | 0 | 20 | 4 | 0 |
| WK 8 | 0 | 1 | 0 | 0 |
| WK 9 | 0 | 0 | 0 | 0 |
| WK 10 | 0 | 0 | 0 | 0 |
| WK 11 | 0 | 0 | 0 | 0 |
| WK 12 | 0 | 0 | 0 | 0 |
| WK 13 | 0 | 0 | 0 | 0 |
| WK 14 | 0 | 0 | 0 | 0 |
| WK 15 | 0 | 0 | 0 | 0 |
| WK 16 | 0 | 0 | 0 | 0 |

H = 100 yeast cells/ml inoculation
M = 10 yeast cells/ml inoculation
L = 1 yeast cell/ml inoculation
NAT = Natamycin
EDTA = EDTA The Natamycin at 200 ppm is better than EDTA since, at the same inoculation level, the EDTA samples failed by week 8 while the Natamycin samples remained stable through Week 16.

EXAMPLE 3 (Table 2)

A study was done to determine the effect of 50 ppm Natamycin on a Lemon flavored tea beverage as the pH was varied. Beverage C was used. The water hardness employed is 103 ppm as Ca(CO$_3$). The results are reported in Table 2.

TABLE 2

SUMMARY OF TIME TO YEAST SPOILAGE EXPRESSED
AS # OF BOTTLES SPOILED PER WEEK

| ELAPSED TIME (WEEKS) | 1 | 2 | 4 | 5 | 10 | 13 | TOTAL UNITS TESTED 37 |
|---|---|---|---|---|---|---|---|
| NAT50 pH 2.8-HIGH | 0.0 | 0.0 | 0.0 | 0.0 | 0.0 | 0.0 | 37 |
| NAT50 pH 2.8-MED | 0.0 | 0.0 | 0.0 | 0.0 | 0.0 | 0.0 | 37 |
| NAT50 pH 2.8-LOW | 0.0 | 0.0 | 0.0 | 0.0 | 0.0 | 0.0 | 37 |
| NAT50 pH 3.3-HIGH | 0.0 | 0.0 | 0.0 | 0.0 | 0.0 | 0.0 | 37 |
| NAT50 pH 3.3-MED | 0.0 | 0.0 | 0.0 | 0.0 | 0.0 | 0.0 | 37 |
| NAT50 pH 3.3-LOW | 0.0 | 0.0 | 0.0 | 0.0 | 0.0 | 0.0 | 37 |
| NAT50 pH 3.8-HIGH | 0.0 | 0.0 | 0.0 | 0.0 | 0.0 | 0.0 | 37 |
| NAT50 pH 3.8-MED | 0.0 | 0.0 | 0.0 | 0.0 | 0.0 | 0.0 | 37 |
| NAT50 pH 3.8-LOW | 0.0 | 0.0 | 0.0 | 0.0 | 0.0 | 0.0 | 37 |

HIGH = 100 yeast cells/ml inoculation
MED = 10 yeast cells/ml inoculation
LOW = 1 yeast cells/ml inoculation
NAT = Natamycin The results show that 50 ppm Natamycin is effective for about 13 weeks at pH values from 2.8 to 3.8.

Although the invention has been described in detail with respect to preferred embodiments thereof, variations and modifications will be readily apparent to those skilled in the art without departing from the spirit and scope of the inventions as set forth in the claims.

What is claimed is:

1. An aqueous based beverage comprising at least about 0.01% to 0.5% tea solids by weight and a sufficient amount of Natamycin to prevent microbial spoilage, said beverage having a pH of about 2.5 to 6.5.

2. A beverage as defined in claim 1 wherein said Natamycin is present in an amount of at least about 5 ppm.

3. A beverage as defined in claim 1 having sufficient Natamycin to completely inhibit outgrowth of yeast and/or mold.

4. A beverage as defined in claim 1 further comprising sufficient tea solids to result in a significant antioxidant effect.

5. A beverage as defined in claim 1 further comprising an antioxidant and/or an oxygen scavenger in addition to tea solids.

6. A beverage as defined in claim 1 wherein said Natamycin is present in an amount of at least 1.5 times the maximum solubility of said Natamycin in the beverage.

7. A beverage as defined in claim 1 wherein a metal sequestrant is present in an amount sufficient to reduce the effect on the Natamycin of solubilized metals.

8. A beverage as defined in claim 1 further comprising a flavoring agent and/or juice in addition to tea.

9. A beverage as defined in claim 1 which is carbonated.

10. A beverage as defined in claim 1 wherein the water used to prepare the beverage is treated to reduce the water hardness to a level of at least about 120ppm or less measured as calcium carbonate.

11. A method of improving the stability of aqueous based tea beverages containing about 0.01% to 0.5% tea solids to prevent yeast and/or mold growth in the beverage for a period of at least about 6 to 16 weeks which comprises blending at least about 5 ppm of Natamycin into the beverage.

12. A liquid foodstuff including an aqueous tea infusion having about 0.01 to 0.5% tea solids, having no chemical preservatives, a pH of 2.5 to 6.5 and at least about 5 ppm of Natamycin.

* * * * *